United States Patent [19]

Willmund

[11] Patent Number: 5,462,801
[45] Date of Patent: Oct. 31, 1995

[54] FILTER TOW, METHOD FOR THE PRODUCTION THEREOF, AS WELL AS TOBACCO SMOKE FILTER ELEMENT AND METHOD FOR ITS PRODUCTION

[75] Inventor: Rolf Willmund, Emmendingen, Germany

[73] Assignee: Rhone-Poulenc Rhodia Aktiengesellschaft, Freiburg, Germany

[21] Appl. No.: 95,676

[22] Filed: Jul. 21, 1993

[30] Foreign Application Priority Data

Jul. 9, 1993 [DE] Germany .............. 43 22 967

[51] Int. Cl.⁶ .............. D02G 3/00; B32B 23/14; B32B 23/16; B32B 23/20
[52] U.S. Cl. .............. 428/372; 428/378; 428/393; 131/332; 131/342; 131/343; 131/345; 210/500.1; 210/500.3; 210/500.31; 210/500.32; 264/200; 264/207; 264/211; 264/211.11; 264/211.13; 264/211.14; 264/211.15; 264/211.16
[58] Field of Search .............. 428/372, 378, 428/393; 264/200, 211.11, 207, 177.2, 211.13, 211.14, 211.15, 211.16; 200/500.3, 500.31, 500.32, 504, 505, 506, 508; 131/332, 343, 345, 342

[56] References Cited

U.S. PATENT DOCUMENTS

| | | | |
|---|---|---|---|
| 2,953,837 | 9/1960 | Crawford | 428/393 |
| 3,057,038 | 10/1962 | Soehngen | 428/393 |
| 3,330,286 | 7/1967 | White | 131/167 |
| 3,393,685 | 7/1968 | Mumpower, II et al. | 131/267 |
| 3,422,013 | 1/1969 | White et al. | 260/17 |
| 3,428,723 | 2/1969 | Harrington, Jr. | 264/207 |
| 3,451,887 | 6/1969 | Toney et al. | 428/393 |
| 3,756,886 | 9/1973 | Watson | 428/372 |
| 4,074,724 | 2/1978 | Morie et al. | 131/267 |
| 4,221,226 | 9/1980 | Kiefer et al. | 131/267 |
| 4,729,391 | 3/1988 | Woods et al. | 131/332 |
| 5,141,006 | 8/1992 | Lee et al. | 131/331 |
| 5,150,721 | 9/1992 | Lee et al. | 131/331 |
| 5,275,859 | 1/1994 | Phillips et al. | 428/371 |

FOREIGN PATENT DOCUMENTS

| | | |
|---|---|---|
| 2075328 | 11/1981 | United Kingdom . |
| 09741 | 9/1990 | WIPO . |

*Primary Examiner*—B. Hamilton Hess
*Assistant Examiner*—J. M. Gray
*Attorney, Agent, or Firm*—Bucknam and Archer

[57] ABSTRACT

A filter tow from cellulose acetate filaments and/or staple fibers is described on the surface of which an additive from cellulose chain-splitting enzymes is present, at least the surface of the filaments and staple fibers consisting of a cellulose acetate having an acetyl number of less than 53%, preferably less than 49%. The method for the production of such a filter tow comprises spinning cellulose acetate filaments from a solution in acetone, of cellulose acetate of an acetyl number of at least 53% if necessary, cutting the filaments to staple fibers, gathering the filaments and/or staple fibers to a filter tow and applying an additive, the filaments and staple fibers being hydrolyzed and as additive one of cellulose chain-splitting enzymes is used. There are described also a tobacco smoke filter element from such a filter tow and a method for its production. The filter tow and the tobacco smoke filter element show improved biodegradation under the action of environmental influences, but without danger of degradation when they are stored under the conditions customarily used today.

14 Claims, No Drawings

5,462,801

FILTER TOW, METHOD FOR THE PRODUCTION THEREOF, AS WELL AS TOBACCO SMOKE FILTER ELEMENT AND METHOD FOR ITS PRODUCTION

FIELD OF THE INVENTION

This invention relates to a filter tow consisting of cellulose acetate filaments and/or cellulose acetate staple fibers, on the surface of which an additive is present.

The invention further relates to a method for the production of such a filter tow, essentially by spinning cellulose acetate filaments by extruding a solution of cellulose acetate having an acetyl number of at least 53% in acetone through a multi-hole spinneret and if necessary, subsequently cutting the cellulose acetate filaments to cellulose acetate staple fibers, gathering a plurality of the cellulose acetate filaments or cellulose acetate staple fibers thus obtained to a filter tow and applying an additive on the surface of the cellulose acetate filaments and cellulose acetate staple fibers.

The invention relates also to a tobacco smoke filter element consisting of a section of a transverse-axially compacted filter tow of cellulose acetate filaments and/or cellulose acetate staple fibers hardened by means of a cellulose acetate plasticizer or an adhesive, on the surface of which an additive is present.

Finally the invention relates to a method for the production of such a tobacco smoke filter element by providing a filter tow consisting of cellulose acetate filaments and/or cellulose acetate staple fibers with a plasticizer for cellulose acetate or with an adhesive, subsequently transverse-axially compacted and if necessary, wrapping this filter tow with a wrapping strip, cutting the filter tow thus compacted and if necessary, wrapped into individual tobacco smoke filter rods, and finally cutting these tobacco smoke filter rods into individual tobacco smoke filter elements.

DESCRIPTION OF THE PRIOR ART

Cigarette filters rot comparatively slowly and therefore are an annoyance to broad sections of the population in places where there is much smoking.

For most cigarette filters there is used today fibrous cellulose acetate having an acetyl number between 53 and 57% (cf. for example U.S. Pat. No. 2,953,837. The numerical values indicated in that document, namely 38 to 41% for the acetyl content, correspond to the above named values of 53 to 57% for the acetyl number).

Compared with other, in particular synthetic polymers, such a cellulose acetate is indeed biodegradable, but the time spans after which cigarette filters of such fibrous material have disappeared at least optically under the action of environmental influences are too long in today's estimation.

German patent application 40 13 293 and German patent application 40 13 304 describe cigarette filters which are decomposable relatively quickly under the action of environmental influences, but these cigarette filters consist of a section of a transverse-axially compacted fiber skein of fibers of spun PHB (polyhydroxybutyric acid) or a copolymer of PHB and PHV (polyhydroxyvaleric acid). These polymers are not being used at present, at least not to any appreciable extent for the production of filter tow and tobacco smoke filter elements, a fact which may be due to the insufficient industrial availability of these polymers, to the effect of the taste of the tobacco, different from cellulose acetate and to as yet unclarified process technological problems in the processing of such polymers to filter tow and tobacco smoke filter elements (for example in connection with the hardening of such tobacco smoke filter elements or in connection with the use of problematic solvents in spinning threads from these polymers).

From German patent application 39 14 022 new plastic materials are known which are readily biodegradable by composting and their use for the production of sheaths/containers for oil lamps, eternal light oil candles, composition oil lamps, other grave lamp models, sacrificial lamps and foils is known. As plastic materials are cited in German patent application 39 14 022 those on the basis of cellulose esters, such as cellulose acetate, with additives, such as polyesters, citric acid esters, phosphoric acid esters and organic iron compounds. However, German patent application 39 14 022 does not give any indication of the possibility to accelerate the biodegradation of filter tow and tobacco smoke filter elements. Furthermore, the formulation described in German disclosure 39 14 022 is not suitable for the production of filter tow and tobacco smoke filter elements because of too high a proportion of plasticizer in the cellulose acetate.

Filter tow and tobacco smoke filter elements of cellulose acetate fibers on the surface of which an additive is present are further known for example from German Patent 1,079,521. According to German Patent 1,079,521, the additive applied on the surface of the cellulose acetate fibers serves to improve the roughness of these fibers. No suggestion, however, can be found in German Patent 1,079,521 how to accelerate the biodegradability of filter tow and of tobacco smoke filter elements.

Recently the microbioligical degradation of cellulose acetate under a variety of environmental conditions has been described in several scientific publications. Thus, for example, the publication "DEGRADATION OF CELLULOSE ACETATE FILTERS IN AQUEOUS SYSTEMS" by Eberhard Teufel and Rolf Willmun, read at the "JOINT MEETING OF SMOKE AND TECHNOLOGY GROUPS" of CORESTA on Sep. 16, 1991 in Utrecht, Netherlands, describes the mechanism of the biodegradation of cellulose acetate. Another publication, namely "THE FATE OF CELLULOSE ACETATE IN THE ENVIRONMENT: AEROBIC BIODEGRADATION OF FILTER TOW FIBERS" by Charles M. Buchanan, Robert M. Gardner, Ronald J. Komarek and David Strickler, read at the "TOBACCO CHEMIST RESEARCH CONFERENCE" on Oct. 22, 1991 in Asheville, N.C., USA, describes the aerobic degradation of cellulose acetate.

Another publication, namely "Effects of Natural Polymer Acetylation on the Anaerobic Bioconversion to Methane and Carbon Dioxide", by C. J. Rivard et al, published in "Applied Biochemistry and Biotechnology", Volume 34/35, 1992, pages 725 to 736, described the anaerobic degradation of cellulose acetate.

It is evident from the three above-mentioned publications that both aerobic and anaerobic degradation of cellulose takes place faster with decreasing acetyl number.

However, no indication can be read from the cited publications about the possibility of accelerating the biodegradation of filter tow and tobacco smoke filter elements from cellulose acetate: In particular the two last-named publications indicate that the biodegradation of cellulose acetate can be accelerated by lowering their acetyl number, but they say nothing as to how this could be technically realizable for filter tow and tobacco smoke filter elements of cellulose acetate fiber material.

A summary of the prior art therefore, shows that for filter tow consisting of cellulose acetate fiber material and for tobacco smoke filter elements made of such a filter tow, no solution is known as yet to accelerate their biodegradation.

SUMMARY OF THE INVENTION

It is, therefore, an object of the invention to make available a filter tow consisting of cellulose acetate filaments and/or staple fibers which shows improved biodegradation under the action of environmental influences.

It is also an object of the invention to make available a method for the production of such a filter tow.

It is still another object of the invention to make available a tobacco smoke filter element consisting of a section of a transverse-axially compacted filter tow of cellulose acetate filaments and/or staple fibers hardened by means of a cellulose acetate plasticizer or an adhesive, which shows improved biodegradation under the action of environmental influences.

Finally, it is another object of the invention to provide a method for the production of such tobacco smoke filter elements.

As to the filter tow, the problem is solved by a filter tow consisting of cellulose acetate filaments and/or cellulose acetate staple fibers, on the surface of which an additive is present, the filter tow being characterized in that the additive consists of cellulose chain-splitting enzymes and at least the surface of the cellulose acetate filaments and staple fibers consists of a cellulose acetate of an acetyl number of less than 53%, preferably less than 49%.

As to the method of the production of the filter tow, the problem is solved by a method for the production of a filter tow essentially by spinning cellulose acetate filaments by extruding a solution of cellulose acetate of an acetyl number of at least 53% in acetone through a multi-hole spinneret and if necessary, subsequently cutting of the cellulose acetate filaments to cellulose acetate staple fibers, gathering of a plurality of the cellulose acetate filaments and/or cellulose staple fibers thus obtained to a filter tow and applying an additive on the surface of the cellulose acetate filaments and cellulose acetate staple fibers,
the method being characterized in that the cellulose acetate filaments and cellulose acetate staple fibers are subjected to a hydrolysis such that at least the cellulose acetate of these filaments and staple fibers present on the surface has after the hydrolysis treatment an acetyl number of less than 53%, preferably less than 49%, and as additive, one consisting of cellulose chain-splitting enzymes is applied.

Preferably the hydrolysis treatment is carried out with caustic soda solution or with gaseous ammonia after spinning of the cellulose acetate filaments or after the cellulose acetate filaments have been cut into staple fibers.

As to the tobacco smoke filter element, the problem is solved by a tobacco smoke filter element consisting of a section of a transverse-axially compacted filter tow of cellulose acetate filaments and/or staple fibers hardened by means of a cellulose acetate plasticizer or an adhesive, on the surface of which an additive is present, characterized in that the additive consists of cellulose chain-splitting enzymes and at least the surface of the cellulose acetate filaments and staple fibers consists of a cellulose acetate having an acetyl number of less than 53%, preferably less than 49%.

As to the method for the production of the tobacco smoke filter element, the problem is solved by a method for the production of a tobacco smoke filter element by providing a filter tow consisting of cellulose acetate filaments and/or staple fibers with a cellulose acetate plasticizer or an adhesive, subsequently transverse-axially compacting and possibly wrapping this filter tow with a wrapping strip, cutting the filter tow thus compacted and possibly wrapped into individual tobacco smoke filter rods, and finally, cutting these tobacco smoke filter rods into individual tobacco smoke filter elements, the method being characterized in that as filter tow, a filter tow according to claim 1 is used or as filter tow there is used one in which the cellulose acetate of which the filaments and staple fibers consist of, is soluble in acetone and has an acetyl number of at least 53%, the cellulose acetate filaments or staple fibers are subjected to a hydrolysis treatment such that at least one cellulose acetate of these filaments and staple fibers present on the surface has after the hydrolysis treatment, an acetyl number of less than 53%, preferably less than 49%, and an additive of cellulose chain-splitting enzymes is applied on the surface of the cellulose acetate filaments and staple fibers.

Preferably the hydrolysis treatment is carried out with caustic soda solution or with gaseous ammonia.

The cellulose chain-splitting enzymes used for the invention are cellulases, for example, cellulases obtained from *Trichoderma veridi* can be used for the invention.

Naturally, the hydrolysis treatment according to the invention can be carried out also with hydrolysis agents other than caustic soda solution and ammonia, for example with other strong bases or acids, or even with ester-splitting enzymes, like esterases.

By a filter tow it is to be understood within the scope of the invention a band of a plurality of cellulose acetate filaments and/or staple fibers (cf. the definition of the term "filter tow" for example in German patent application 41 09 603). Preferably the filter tow of the invention is a band of a plurality of cellulose acetate filaments, and these filaments may be crimped, in particular in a crimping machine under pressure.

By a filament it is to be understood that a practically endless fiber, and the term "staple fiber" means a fiber of limited length (for these two definitions see "Rompps Chemie-Lexikon, 8th newly revised and enlarged edition, Franckh'sche Verlagshandlung, W. Keller & Co., Stuttgart/ 1987, resp. Vol. 2, 1283, and Vol. 5, page 3925—with reference to DIN 60 001 T2 December 1974).

The tobacco smoke filter element according to the invention is preferably a cigarette filter, but it may also be a filter for cigars, cigarillos or tobacco pipes.

By acetyl number it is understood within the scope of the invention, the proportion of bound acetic acid in the cellulose acetate, expressed in mass-% (cf. Ullmann's Encyclopedia of Industrial Chemistry, Fifth, Completely Revised Edition, Volume A 5, pages 444 and 445 - VCH Verlagsgesellschaft mbH, H-6940 Weinheim, Federal Republic of Germany 1986).

The following advantages are achieved with the invention:

Compared with known filter tow and known tobacco smoke filter elements of cellulose acetate fiber material, the filter tow and the tobacco smoke filter element according to the invention show an acceleration of the rotting rate under environmental influences; yet storage of the filter tow and of the tobacco smoke filter element according to the invention under the conditions customarily used today, is readily possible without danger of microbiological degradation.

It is of special advantage that for the production of the filter tow of the invention, one can start with conventional methods for the production of a filter tow consisting of cellulose acetate fiber material; through the additional new measure of the hydrolysis, however, one obtains a filter tow, the cellulose acetate filaments and/or staple fibers of which have at least on their surface, a cellulose acetate of an acetyl number of less than 53%, preferably less than 49%. A thus modified cellulose acetate can be split under the action of cellulose chain-splitting enzymes into water-soluble and microbiologically well degradable components of low molecular weight. By way of explanation it should be mentioned that the above-mentioned desirable cellulose acetate with an acetyl number of less than 48% is not soluble in acetone and therefore cannot be spun by the conventional spinning process (with acetone as solvent). By applying the principle of the conventional method for the production of a filter tow consisting of cellulose acetate fiber material, the investment costs for the apparatus for carrying out the new method for the production of the new filter tow can be kept relatively low (with existing apparatus, all that the new method requires is an additional arrangement for the hydrolysis as well as an additional arrangement for applying the cellulose chain-splitting enzymes).

The same applies to the production of the tobacco smoke filter element according to the invention.

The invention will be elucidated more specifically below with reference to an example.

COMPARATIVE EXAMPLE

A cellulose acetate spinning solution having a solid content of 28 mass-% cellulose acetate and 0.5 mass-% titanium dioxide in acetone was prepared. The water content of this spinning solution was adjusted to 3 mass-%. The cellulose acetate used had an acetyl number of 55.4% and a degree of polymerization (DP) of 220. This spinning solution was filtered and spun by dry spinning on a conventional filter tow spinning machine. The resulting cellulose filaments were gathered to a band, crimped by means of a crimping machine under pressure dried in a drum dryer. The aforesaid band had, on entering the crimping machine, an entrance speed of 550 m/min. The stay of the band of crimped cellulose acetate filaments in the drum dryer was 5 minutes. The resulting filter tow of crimped cellulose acetate filaments was at first loosely deposited by means of a packing machine and then compressed to a bale. The bale had a residual moisture of 5.5 mass-%.

The specification of the filter tow thus produced was 3 Y 35 HK. This designation means

| filament titer | 3.3 dtex |
|---|---|
| total titer | 38,500 dtex |

The aforesaid filter tow was processed on a filter rod machine Model KDF 2/AF2 of the firm Korber AG, Hamburg, Federal Republic of Germany, at a speed of 400 m/min to filter rods of the following specification:

| length | 126 mm |
|---|---|
| diameter | 7.85 mm |
| draw resistance | 390 da Pa |
| weight of cellulose acetate | 690 mg |

In the production of these filter rods, triacetin was applied as plasticizer for the cellulose acetate, so that namely, the finished filter rods contained 55 mg of triacetin per filter rod.

The filter rods were cut into 6 cigarette filters of an equal length of 21 mm.

The results of the in vitro degradation tests were given hereinbelow after the examples.

EXAMPLE

Ten kg of the filter tow produced according to the comparative example were hydrolyzed under laboratory conditions as follows:

The filter tow was placed in a vessel and the vessel was closed.

In the closed vessel the filter tow was successively exposed for one hour each time to the action of
water vapor
ammonia vapor and
carbon dioxide gas. Between the various stages described above the vessel was evacuated.

The above three-stage treatment was repeated three times.

Then the filter tow was removed from the vessel and tested for acetyl number and solubility. The results were the following:

| Acetyl number | 45% |
|---|---|
| Solubility: | The solution of the filter tow in acetone (3%) contained clearly visible amounts of insoluble parts. |

The above-mentioned filter tow was processed to filter rods on a filter rod machine Model KDF 2/AF2 of Korber AG, Hamburg, Federal Republic of Germany, at a speed of now 50 m/min.

In the production of these filter rods, triacetin was applied as plasticizer for the cellulose acetate, so that namely the finished filter rod contained 55 mg triacetin per filter rod.

As a variation from the production of the filter rods according to the comparative example, the filter rod machine was modified in that a powder proportioning device was provided between the deflection roll of processing part AF2 and the inlet nozzle of the extrusion part KDF2. With this proportioning device, a cellulose chain-splitting enzyme in powder form was applied on the filter tow. As cellulose chain-splitting enzyme was used, a cellulose from *Trichoderma viridi*, namely 1,4-[1,3; 1,4]- beta-D-glucan 4-glucanohydrolase of the firm Sigma Chemie GmbH, Federal Republic of Germany.

The filter rods produced had the following specification:

| | |
|---|---|
| length | 126 mm |
| diameter | 7.85 mm |
| draw resistance | 390 da Pa |
| weight of cellulose acetate | 690 mg |
| weight of cellulose chain-splitting enzyme (cellulase) | 3 mg |

As in the comparative example, the filter rods thus produced were cut into six cigarette filters of a length of 21 mm.

The results of the degradation tests in vitro are compiled below.

DEGRADATION TESTS IN VITRO

One cigarette filter each according to the comparative example and according to the Example were, to begin with, freed from the filter wrapping paper, weighed and then provided with 10 ml sterile water in a sterile Erlenmeyer flask in each instance.

In addition, a cigarette filter according to the comparative example was likewise freed from the filter wrapping paper, weighed and provided in a sterile Erlenmeyer flask with an enzyme solution which contained 0.05 mg/ml of the cellulase named in the example.

The above described samples were formulated in multiple batches.

After 3 and 28 days respectively, the fiber residues that were left of the cigarette filters were removed from the Erlenmeyer flask, dried, conditioned to equilibrium moisture and weighed.

The results of these degradation tests are shown in the table hereinbelow. It should be noted that the weight loss caused by elution of a part of the triacetin by water has not been taken into account. Due to the inaccuracy because of the elution of a part of the triacetin and also other inaccuracies (because of residual moisture, etc.), a weight loss of the cigarette filters of less than 5% is regarded as not significant for the enzymatic degradation.

| | % Weight loss after days | |
|---|---|---|
| | 2 | 28 |
| Cigarette filter according to the comparative example | 1 | 2 |
| Cigarette filter according to the comparative example + enzyme solution | 2 | 2 |
| Cigarette filter according to the example | 37 | 80 |

What is claimed is:

1. A filter tow stable under conventional storage conditions but exhibiting improved biodegradation under the action of environmental influences, said filter tow consisting of cellulose acetate filaments, the filaments having a surface, on said surface an additive being present, said additive consisting of cellulose chain-splitting enzymes, the filter tow having been produced by a process which consists of the following steps:

1) spinning cellulose acetate filaments by extruding a solution of cellulose acetate having an acetyl number of at least 53% in acetone through a multi-hole spinneret to obtain spun filaments, 2) gathering a plurality of the cellulose acetate filaments from step 1) thus obtained to a filter tow and 3) subjecting said filter tow from step 2) to a hydrolysis treatment so that at least the cellulose acetate of said filaments, present on surface thereof has after the hydrolysis treatment an acetyl number of less than 53%;

4) dusting said cellulose chain-splitting enzymes on the surface of said cellulose acetate filaments.

2. The filter tow according to claim 1, wherein after the hydrolysis treatment the acetyl number is less than 49%.

3. A filter tow stable under conventional storage conditions but exhibiting improved biodegradation under the action of environmental influences, said filter tow consisting of cellulose acetate filaments and cellulose acetate staple fibers, the filaments and staple fibers having a surface, on said surface an additive being present, said additive consisting of cellulose chain-splitting enzymes, the filter tow being produced by a process which consists of the following steps:

1) spinning cellulose acetate filaments by extruding a solution of cellulose acetate having an acetyl number of at least 53% in acetone through a multi-hole spinneret to obtain spun filaments, 2) cutting said cellulose acetate filaments to cellulose acetate staple fibers, 3) gathering a plurality of the cellulose acetate filaments and staple fibers thus obtained to a filter tow, 4) subjecting said filter tow from step 3) to a hydrolysis treatment whereby at least the cellulose acetate of said filaments and said staple fibers present on the surface thereof has after the hydrolysis treatment an acetyl number of less than 53%

5) and dusting said cellulose, chain-splitting enzymes on the surface of said cellulose acetate filaments and said cellulose acetate staple fibers.

4. The filter tow according to claim 3, wherein after the hydrolysis treatment the acetyl number is less than 49%.

5. A method for the production of a filter tow consisting of cellulose acetate filaments, said filter tow being stable under conventional storage conditions but exhibiting improved biodegradation under the action of environmental influences, said filaments having a surface, on said surface an additive being present, said additive consisting of cellulose chain-splitting enzymes, at least the surface of said filaments having an acetyl number less than 53% consisting of the steps of:

1) spinning cellulose acetate filaments by extruding a solution of cellulose acetate having an acetyl number of at least 53% in acetone through a multi-hole spinneret, 2) gathering a plurality of said cellulose acetate filaments from step 1), to a filter tow, 3) subjecting said filter from step 2) to a hydrolysis treatment; of said filter whereby at least the cellulose acetate of said filaments, present on the surface thereof has after the hydrolysis an acetyl number of less than 53%;

4) dusting said cellulose chain-splitting enzymes on the surface of said cellulose acetate filaments.

6. The method according to claim 5, wherein after the hydrolysis treatment the acetyl number is less than 49%.

7. The method according to claim 5 wherein the hydrolysis treatment is carried out with caustic soda solution or with gaseous ammonia after step 1).

8. The method according to claim 5 wherein after step 1)

said filaments are cut to staple fibers and said hydrolysis treatment is carried out after said filaments have been cut to staple fibers.

9. The method of preparing a tobacco smoke filter element, consisting of a section of a transverse-axially compacted filter tow, said filter tow being stable under conventional storage conditions but exhibiting improved biodegradation under the action of environmental influences, said filter tow consisting of cellulose acetate filaments, the filaments having a surface, on said surface an additive being present, said additive consisting of cellulose chain-splitting enzymes, the filter tow having essentially been produced by the following steps:

1) spinning cellulose acetate filaments by extruding a solution of cellulose acetate having an acetyl number of at least 53% in acetone through a multi-hole spinneret to obtain spun filaments;

2) gathering a plurality of the cellulose acetate filaments from step 1) thus obtained to a filter tow, 3) hydrolyzing said cellulose acetate filaments;

4) dusting cellulose chain-splitting enzymes on the surface of said cellulose acetate filaments, further, in order to obtain the tobacco smoke filter element, hardening said filter tow with a plasticizer for cellulose acetate or with an adhesive, and subsequently transverse-axially compacting and wrapping said compacted filter tow with a wrapping strip, cutting said compacted and wrapped filter tow into individual tobacco smoke filter rods, and finally cutting said tobacco smoke filter rods into individual tobacco smoke filter elements.

10. A method for the production of a filter tow consisting of cellulose acetate filaments and cellulose acetate staple fibers, said filter tow being stable under conventional storage conditions but exhibiting improved biodegradation under the action of environmental influences, said filaments and cellulose acetate staple fibers having a surface, on said surface an additive being present, said additive consisting of cellulose chain-splitting enzymes, at least the surface of said filaments having an acetyl number less than 53% consisting of the steps of:

1) spinning cellulose acetate filaments by extruding a solution of cellulose acetate having an acetyl number of at least 53% in acetone through a multi-hole spinneret, 2) cutting said cellulose acetate filaments to cellulose acetate staple fibers, 3) gathering a plurality of said cellulose acetate filaments and staple fibers from step 2) to a filter tow, 4) subjecting said filter tow from step 3)

5) said cellulose acetate filaments are subjected to a hydrolysis treatment whereby at least the cellulose of said filaments and said staple fibers of said filter tow present on the surface thereof has after the hydrolysis treatment an acetyl number of less than 53%;

5) dusting said cellulose chain-splitting enzymes on the surface of said cellulose acetate filaments and staple fibers of said filter tow.

11. The method according to claim 10, wherein after the hydrolysis treatment the acetyl number is less than 49%.

12. The method according to claim 10 wherein the hydrolysis treatment is carried out with caustic soda solution or the gaseous ammonia after step 1).

13. The method according to claim 10 wherein said hydrolysis treatment is carried out after said filaments have been cut to staple fibers.

14. The method of preparing a tobacco smoke filter element, consisting of a section of a transverse-axially compacted filter tow, said filter tow consisting of cellulose acetate filaments and cellulose acetate staple fibers, said filter tow being stable under conventional storage conditions but exhibiting improved biodegradation under the action of environmental influences, the filaments and staple fibers having a surface, on said surface an additive being present, said additive consisting of cellulose chain-splitting enzymes, the filter tow having essentially been produced by the following steps:

1) spinning cellulose acetate filaments by extruding a solution of Cellulose acetate having an acetyl number of at least 53% in acetone through a multi-hole spinneret to obtain spun filaments;

2) cutting said cellulose acetate filaments to cellulose acetate staple fibers, 3) gathering a plurality of the cellulose acetate filaments and staple fibers thus obtained to a filter tow, 4) hydrolyzing said cellulose acetate filaments and cellulose acetate staple fibers whereby at least the cellulose acetate of said filaments and staple fibers present on the surface thereof have after the hydrolysis an acetyl number of less than 53%;

5) dusting a cellulose chain-splitting enzyme on the surface of said cellulose acetate filaments, and further in order to obtain the tobacco smoke filter elements hardening said filter tow with a plasticizer for cellulose acetate or with an adhesive;

subsequently transverse-axially compacting and wrapping said compacted filter tow with a wrapping strip, cutting said compacted and wrapped filter tow into individual tobacco smoke filter rods, and finally, cutting said tobacco smoke filter rods into individual tobacco smoke filter elements.

* * * * *